Nov. 12, 1929.  A. C. ATTENDU  1,735,718
FUEL INJECTOR
Filed April 4, 1925
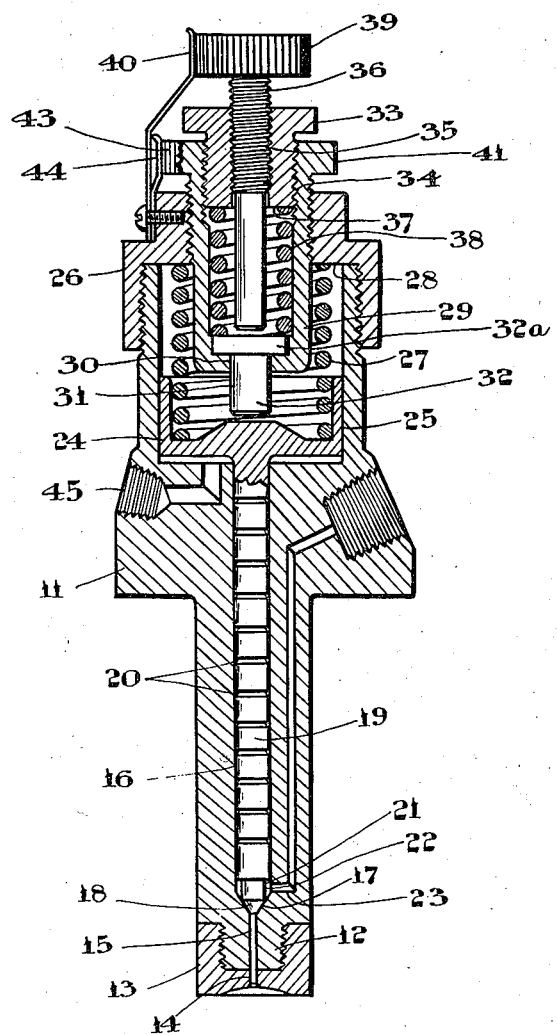
INVENTOR
ANDRÉ C. ATTENDU
BY Fetherstonhaugh & Co
ATTORNEYS Patented Nov. 12, 1929

1,735,718

UNITED STATES PATENT OFFICE

ANDRÉ C. ATTENDU, OF MONTREAL, QUEBEC, CANADA

FUEL INJECTOR

Application filed April 4, 1925. Serial No. 20,775.

This invention relates generally to certain new and useful improvements in fuel injectors for flexible internal combustion engines of the high compression or Diesel type. More particularly, the invention is concerned with the improvement of injectors designed to open automatically to a constant degree, irrespective of variations in speed and load, and in direct response to an increased pressure periodically developed in the injector line by the action of the fuel pumps.

In a flexible engine of the high compression or Diesel type, variation of speed or load is attained as a result of two factors, one being the time of injection and the other factor being the amount of fuel injected for each consecutive stroke. At slow speed or minimum load, a quantity of fuel should be injected just sufficient to keep the engine running, and for increased speed or load the amount of fuel for each consecutive stroke is proportionally greater.

If an injector of the constant lift is designed to give the effective area of opening required for efficient vaporization and injection of fuel when the engine is operating at low speed or with minimum load I find that on increasing the amount of fuel to raise the speed or to carry an increased load at the same speed, the effective opening of the injector remaining the same for maximum amounts as it does for minute amounts, an excessive increase of pressure is developed in the fuel line and the time or period of injection is unduly prolonged.

The aforementioned excessive pressure developed in the fuel line rises far above that required for efficient vaporization and injection of the fuel even when operating with maximum speed or load. In fact, this pressure increases to such an extent that there is grave danger of bursting the injector line and the resulting strain on all working parts of the fuel injecting system is such as to necessitate that these parts be of a quite heavy construction. This excessive increase in pressure is obviously due to the necessity, when operating with increased speed or load, of passing a greater amount of fuel through an opening restricted to the extent necessary to insure proper vaporization of the small amount of fuel injected when the engine is idling or operating at minimum speed.

The increase in the time required for injection of the fuel when operating with increased speed or load likewise results from the necessity of passing the greater amount of fuel required under such conditions through the same opening and in a shorter period of time than is permissible at idling or slow speeds. For example, an engine is running at 400 R. P. M. and the speed is then increased to 1600 R. P. M. If the amount of fuel required at 400 R. P. M. is assumed to be 1, with injection taking place for 10° of the stroke and if we assume that the increased amount of fuel required at 1600 R. P. M. is 4, then the theoretical time for injection at the higher speed will be approximately 40° crank angle. In practice, however, we find that the time required at the higher speed is materially greater and that injection actually takes place throughout some 60° crank angle. Thus, injection continues until the piston has passed far beyond top dead center and, due to the loss of the heat of expansion, late or incomplete burning of the fuel occurs with resulting high fuel consumption, low efficiency and smoky exhaust.

The present invention, which is designed to remedy these defects is characterized by the provision of means functioning automatically to regulate the effective opening of the injector valve in direct response to pressure variations in the fuel line and in such manner as to insure efficient vaporization and injection of fuel for all conditions of engine operation. Structurally the invention comprises an injector including a valve which is maintained closed against the normal pressure in the injector line through the medium of a spring counterbalance constantly engaging the valve and exerting through a pressure approximately equal to the opposing normal pressure in the injector line. A second spring counterbalance is arranged to be engaged by the valve when the latter reaches the degree of opening necessary for efficient injection at low speeds of operation and functions to restrict the valve to its minimum degree of opening as long as low speed operating conditions prevail. As speed or load is increased, more fuel is required, and the resulting increased pressure in the fuel line is raised to the point sufficient to overcome the resistance of the second spring counterbalance and to effect a maximum opening of the valve necessary to efficient injection when high speed of maximum load conditions prevail.

In the accompanying drawing, I have shown a sectional longitudinal view of my improved injector.

Referring more particularly to the drawing, 11 designates the body portion of the injector, which may be secured to the cylinder of an engine (not shown) in the usual manner. The lower end of the body 11 is provided with a reduced threaded portion 12 adapted to receive the renewable cap portion 13, which is provided with a central outlet 14 aligned with a vertical passage 15 formed centrally in the lower end of said body portion 11, and communicating at its upper end with a main bore 16, the lower end of which terminates in a conical wall 17 affording a seat for the pointed end 18 of the needle valve. The needle valve is provided with an enlarged stem 19 slidably mounted in the bore 16 and equipped with a series of annular grooves 20, to which oil is supplied for establishing a sealed joint between the stem and the wall of the bore. The lower end of the stem 19 affords a shoulder 21 spaced from the conical wall 17 to define an intervening oil chamber 22, which is in communication with a source of fuel supply (not shown), through the medium of the port 23. The fuel passes from the chamber 22 through the vertical passageway 15 and the central outlet 14, when the needle valve is raised to the open position as hereinafter described.

At its upper end the stem is provided with a piston head 24, which is slidably mounted in a cylinder-like extension 25 of the body 11. The cylinder is provided with a cap 26 which may be screwed or otherwise attached to the cylinder. A spring 27 is placed between the underside 28 of the cap and the end of the piston 24 to regulate the atomizing pressure of the fuel when the engine is running at low speed. Adjustably mounted in the cap is the chamber 29, the lower end of which is adapted to extend within the cylinder-like extension 25 of the body portion. The lower end of the chamber is provided with an aperture 30, through which the shank 31 of a pin 32 extends, the head 32$^a$ of which is adapted to be a sliding fit in the chamber. The upper end of the chamber is provided with an internally and externally threaded nut 33, the outer thread of which is adapted to engage with the threaded portion 34 of the chamber. The inner threaded portion 35 of the nut is adapted to receive an adjusting screw 36, the lower end of which extends into the cylinder and engages with the head of the pin 32 to limit the extreme upward movement of the needle valve. Between the head 32$^a$ of the pin and the underside 37 of the nut 33 and surrounding the end of the adjusting screw, a coil spring 38 is mounted. The edge of the head 39 of the adjusting screw may be serrated and a spring 40 may be provided to lock the screw in any adjusted position by engaging with the serrations, said spring being attached in any suitable manner to the body portion or as shown in the drawing to the cap. The head 41 of the chamber may also be provided with a serrated or knurled edge 43, and a spring 44 attached in any suitable manner to the cap or body portion may also be provided to engage with the serrations or knurling to hold the chamber in any adjusted position. A means is provided for the return of the fuel to the source of supply which may leak through piston which consists of an aperture 45 provided in the upper portion of the body.

The operation of the injector is as follows: Taking as an example the engine used in the test in which the lift was .003″. Assuming the pressure at slow speeds necessary for vaporization of the fuel to be from 5000 lbs. to 7000 lbs. fuel is fed into the chamber 22 and presses against the shoulder 21 of the needle valve. The pressure exerted on the needle valve by spring 27 is just sufficient to hold the valve closed against the cylinder pressure and the normal pressure of the fuel line and to insure proper atomization of the small quantities of fuel injected at slow or idling speeds of operation. The lift of the needle valve in response to fuel injection pressures ranging between five thousand and seven thousand pounds is restricted by the stop pin 32 on which spring 38 exerts a pressure of approximately seven thousand pounds. The restricted lift of the valve, as determined by the stop pin 32 is approximately .003″ which is just sufficient to afford the degree of valve opening suitable for proper atomization of the small quantities of fuel injected at slow or idling speeds. When larger quantities of fuel are injected to incrose the speed or the load capacity the injection pressure rises above seven thousand pounds thus overcoming the resistance of the spring 38 and causing the needle valve to lift to the maximum extent. The maximum permissible lift of the valve may be varied by adjustment of the stop screw 36 while the restricted lift of the valve, as determined by the yieldable stop 32, may be varied by adjustment of the chamber 29 which is adjustably mounted in the cap. When the valve is lifted to the maximum extent it will be apparent that the combined pressure of the springs 27 and 38 will take care of all fuel injection pressures above seven thousand pounds and will exert on the valve an opposing pressure sufficient to insure proper atomization of the larger quantities of fuel injected under such conditions of operation.

What I claim as my invention is:

1. A fuel injector of the reciprocable needle valve type including a valve stop functioning to restrict, to a predetermined degree, the lift of the valve when injecting small quantities of fuel and to permit maximum lift of the valve when injecting larger quantities of fuel.

2. A pressure operated injector of the reciprocable needle valve type including a yieldingly mounted valve stop functioning to restrict the valve lift to a predetermined extent when injecting the small quantities of fuel required for slow or idling speeds and yieldable to permit a further lift of the valve when injecting the larger quantities of fuel required to operate the engine at high speed or under heavy load.

3. A pressure operated fuel injector for high compression engines including a reciprocable needle valve arranged to be lifted by the injection pressure of the fuel in the supply line, a non-yielding stop arranged to regulate the maximum lift of the valve in response to injection pressures characteristic of engine operation at high speed or under heavy load and a second yieldably mounted stop functioning to restrict to a predetermined degree the lift of the valve in response to injection pressures incident to operation of the engine at slow or idling speeds.

4. A pressure operated fuel injector for high compression engines including a reciprocable needle valve arranged to be lifted by the injection pressure of the fuel in the supply line, a spring normally holding the valve closed and exerting thereon a pressure sufficient to insure proper atomization of the relatively small quantities of fuel required at slow or idling speeds of engine operation, a valve stop arranged to restrict the lift of the valve in response to fuel injection pressures characteristic of engine operation at slow or idling speeds, said stop being yieldable to permit maximum lift of the valve as the fuel injection pressure rises to that characteristic of engine operation at high speeds or under heavy load, and a second adjustably mounted valve stop arranged to regulate the maximum lift of the valve.

5. A pressure operated injector for high compression engines, including a reciprocal needle valve arranged to be lifted by the injection pressure of the fuel in the supply line, a spring normally holding the valve closed and exerting thereon a pressure sufficient to insure proper atomization of the relatively small quantities of fuel required at slow or idling speeds of engine operation, a valve stop positioned above the needle valve and engageable therewith to restrict the lift of said valve to a predetermined degree when injecting the relatively small quantities of fuel required at slow or idling speeds of engine operation, a spring normally serving to hold said stop in a lowered position but yieldable to permit the stop to be raised by the valve when the latter is subjected to the pressure incident to injection of the larger quantities of fuel required to operate the engine at high speeds or under heavy loads, said last mentioned spring cooperating with the first mentioned spring to impose sufficient pressure on the valve to insure proper atomization of the said larger quantities of fuel.

6. A pressure operated fuel injector as recited in claim 5 including an adjustably mounted nonyielding stop arranged to be engaged by the first mentioned stop and to cooperate therewith for limiting the maximum lift of the valve.

In testimony whereof I hereunto affix my signature.

ANDRE C. ATTENDU.